United States Patent [19]

Nagele et al.

[11] Patent Number: 4,816,359
[45] Date of Patent: Mar. 28, 1989

[54] ELECTROCHEMICAL SECONDARY ELEMENT WITH AT LEAST ONE POLYMER ELECTRODE

[75] Inventors: Dieter Nagele, Worms; Gernot Kohler, Ludwigshafen; Rainer Bittihn, Kelkheim, all of Fed. Rep. of Germany

[73] Assignee: Varta Batterie Aktiengesellschaft, Hanover, Fed. Rep. of Germany

[21] Appl. No.: 24,266

[22] Filed: Mar. 10, 1987

[51] Int. Cl.[4] .............................................. H01M 4/60
[52] U.S. Cl. .................................................... 429/213
[58] Field of Search ...................... 429/213, 212, 42; 252/182.1

[56] References Cited

U.S. PATENT DOCUMENTS

| | | | |
|---|---|---|---|
| 4,267,244 | 5/1981 | Louzos | 429/213 |
| 4,375,427 | 3/1983 | Miller et al. | 252/512 |
| 4,485,155 | 11/1984 | Holl et al. | 429/194 |
| 4,537,843 | 8/1985 | Shishikura et al. | 429/213 |
| 4,556,617 | 12/1985 | Krueger | 429/213 X |
| 4,559,188 | 12/1985 | Tassone et al. | 264/24 |
| 4,559,284 | 12/1985 | Nishimura et al. | 429/213 |
| 4,560,633 | 12/1985 | Kobayashi et al. | 429/213 |
| 4,565,754 | 1/1986 | Muramatsu et al. | 429/213 |
| 4,585,717 | 4/1986 | Watanabe et al. | 429/213 |
| 4,609,600 | 9/1986 | Heinze et al. | 429/197 |
| 4,628,015 | 12/1986 | Yata et al. | 429/194 |
| 4,640,006 | 2/1987 | Elsenbaumer et al. | 29/623.1 |

FOREIGN PATENT DOCUMENTS

| | | |
|---|---|---|
| 0084330 | 7/1983 | European Pat. Off. . |
| 0098988 | 1/1984 | European Pat. Off. . |
| 0136099 | 4/1985 | European Pat. Off. . |
| 3333034 | 3/1984 | Fed. Rep. of Germany . |
| 3421796 | 1/1985 | Fed. Rep. of Germany . |
| 59-012575 | 1/1984 | Japan . |
| 60-201244 | 10/1985 | Japan . |
| 61-211963 | 9/1986 | Japan . |

OTHER PUBLICATIONS

Patent Abstracts of Japan, vol. 8, No. 142 (E-254) (1579), Jul. 3, 1984 & JP-A-59 51 483 (Showa Denko K.K.).
Patent Abstracts of Japan, vol. 10, No. 145 (E-407) (2202), May 28, 1986 & JP-A-61 8855 (Nippon Denshin Denwa Kosha).
Chemical Abstracts, vol. 97, 1982, p. 522, Abstract No. 138674, Columbus, Ohio, U.S.A.; K. W. Willman et al: "Viologen Homopolymer, Polymer Mixture and Polymer Bilayer Films on Electrodes, Electropolymerization, Electrolysis, Spectroelectrochemistry, Trace Analysis and Photoreduction", & J. Electroanal. Chem. Interfacial Electrochem., 1982.

Primary Examiner—Anthony Skapars
Attorney, Agent, or Firm—Weiser & Stapler

[57] ABSTRACT

A polymer electrode having a thickness which is distributed among several superimposed thin film layers exhibits significantly higher area-specific capacity and current-carrying capacity. This layered arrangement is even more favorable when the thin layers are perforated. These measures are especially effective when the secondary element is operated with high currents.

28 Claims, 1 Drawing Sheet

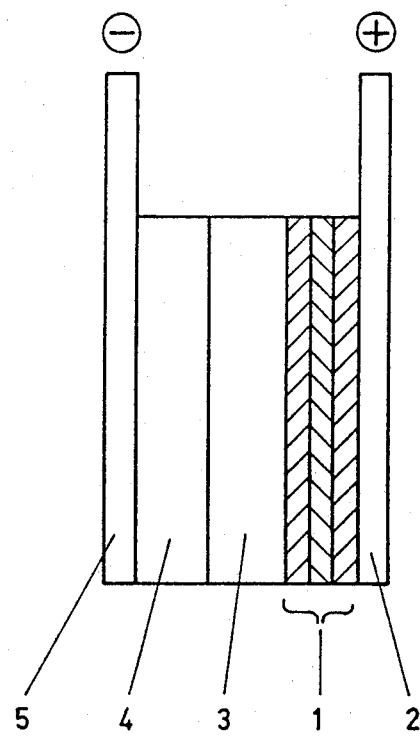

ELECTROCHEMICAL SECONDARY ELEMENT WITH AT LEAST ONE POLYMER ELECTRODE

BACKGROUND OF THE INVENTION

The present invention pertains to an electrochemical secondary element having at least one electrode with an active material comprised of a polymeric compound of polyconjugated structure, which can be doped with cations or anions and which can be formed as a thin, film-like layer.

Polymers with a polyconjugated structure of the main chain are basically insulators. However, it has been shown (see, Heeger and MacDiarmid, *J. Chem. Soc. Chem. Comm.*, 1977, page 578) that the organic polymer polyacetylene in the form of a thin film acquires considerable conductivity by reacting with oxidizers such as iodine, bromine and arsenic pentafluoride. This increased conductivity is several orders of magnitude greater than the conductivity of the compound in its initial state.

The result of the oxidation (removal of y electrons) of the polyacetylene is electron-deficient conducting polymer chains $(CH^{+y})_x$. For stabilization, a corresponding amount of a reduced oxidizing agent A is added, so that the oxidized polyacetylene has the composition $(CH^{+y}A^-_y)_x$. If, for example, iodine is used as the oxidizing agent, then $I_3^-$ ions are accepted as stabilizing opposing ions. Heeger and MacDiarmid also showed that the oxidation of polyacetylene can be accomplished not only by the above-described chemical means, in which the increase in conductivity comes about as a result of a charge transfer between the polymer and the oxidizing agent, but also by electrochemical means. Moreover, polyacetylene can not only be oxidized in an electrochemical cell, but also reduced, which leads to increased conductivity resulting from an excess of electrons along the polymer chains.

For this purpose, two polymer foils are provided with metallic conductors (e.g., platinum) and immersed in a solution of a conducting salt, e.g., lithium perchlorate ($LiClO_4$) in propylene carbonate (PC). When a voltage is applied to this arrangement, electrons are removed from one of the polymers and supplied to the other polymer, i.e., one of the polymers is oxidized and experiences an increase in conductivity corresponding to the charge conversion, while the other polymer is reduced, with a corresponding increase in conductivity. To stabilize the radical cations and radical anions that are formed, the polymers then accept a corresponding number of anions and cations (in this example, $ClO_4^-$ and $Li^+$ ions).

Polymeric compounds which have been converted to the conductive state by electrochemical means are interesting as electrode materials, especially for secondary batteries, because their electrochemical oxidation and reduction can be reversibly performed. EP-OS No. 111,237, for example, specifies a series of known electrochemical systems based on such polymers.

The preparation of the polymer material itself differs from substance to substance. A polyacetylene film, for example, can be prepared by bringing the corresponding monomer into contact with a concentrated solution of a Ziegler catalyst in an inert solvent. When acetylene is blown onto a stationary surface of the catalyst solution, a thin layer of polyacetylene is formed which floats on the surface and which can be removed from the reaction medium. In a variation of this method, an inert carrier (e.g., a glass plate) can be wetted with the catalyst solution to obtain an easily removable polymer layer. Electropolymerization is another method which can be used for the direct production of electron-conducting polypyrrole, polythiophene or polyaniline (e.g., DE-OS No. 3,402,133). In this case, the polymer is deposited by anodic current on an electrically conducting surface from an electrolytic bath including an aqueous or organic solution of the monomer containing a salt with anions suitable for the oxidation.

However, in performing discharge experiments on such electrodes, it was found that at a constant discharge voltage, the duration of the discharge increased more than proportionally with the thickness of the polymer films accumulated during the electrochemical oxidation. Therefore, it was not possible, in an acceptable amount of time, to achieve a charge conversion in proportion to the polymerization time, and accordingly, to the polymer film thickness.

SUMMARY OF THE INVENTION

It is therefore the principal object of this invention to produce an electrochemical secondary element of the foregoing type, with a polymer electrode or electrodes having an improved area-specific capacity, even at high currents (i.e., short charge and discharge times).

This and other objects are achieved in accordance with the present invention by applying at least two thin polymer layers to the flat electrode conductor. The electrode of the present invention can be produced, for example, either by applying additional (self-supporting) polymer films to the conductor-polymer composite obtained in the production of the polymer electrode or by applying several polymer films which have previously been produced on a different substrate to a bare conductor. Electrode materials which are particularly suited to this purpose include polyacetylene, polypyrrole, polythiophene and polyaniline.

For further detail regarding a polymeric electrode according to the present invention, reference is made to the detailed description which follows, and the single accompanying illustration which shows a cross-sectional view of an electrochemical element according to the present invention.

BRIEF DESCRIPTION OF THE DRAWINGS

The FIGURE shows a cross-sectional view of the device of the present invention.

DETAILED DESCRIPTION OF PREFERRED EMBODIMENTS

As shown in the drawing, instead of a single thick layer, the polymer coating 1 of the positive conductor 2 is broken into several thin film layers (in this case, three layers). Either lithium or a polymer (preferably comprised of thin layers in a stacked arrangement) can be used as the negative electrode 4 (with a negative conductor 5). A separator 3 is disposed between the electrodes, and serves in the storage of electrolyte. Surprisingly, it has been found that "layered electrodes" of this type exhibit significantly better kinetics than "solid electrodes" of the same area-specific capacity and thickness (i.e., the current-carrying capacity at equal charge conversions).

In an especially advantageous embodiment according to the present invention, the polymer layers on the conductor are perforated to ensure "unimpeded" access of the electrolyte to the deeper polymer layers. The electrodes have been found to exhibit especially good kinetic behavior in such cases. The polymer films can be perforated by needling or piercing, as well as by laser or eavy ion bombardment. The collective area of the perforations (holes) should not exceed 50% of the electrode surface area.

The arrangement of the holes in the polymer layers can be either regular or irregular, and the arrangement of the holes in one polymer layer can be either staggered or aligned relative to the holes in another polymer layer. Aligned arrangements have been found to be particularly advantageous due to the improved access of electrolyte to the "lower" polymer layers (i.e., the layers with surfaces which are not in direct contact with the electrolyte). This is especially so for electrodes with more than two polymer layers.

The size or diameter of the holes is preferably at least 10 $\mu$m (although no generally valid maximum value can be given). The maximum diameter of the holes, and the number of holes per unit area, are determined by the area of the electrode and the required stabiity of the perforated polymer film. In general, it has been found to be advantageous to provide the foil with many small holes rather than a few large holes. The number of holes will also depend on the diameter of the individual holes. It is unnecessary for all holes to be equal in size. The portion of the total surface area occupied by the holes is not subject to any special limitation, but hole areas of 10–80%, and especially of 25–70% of the total surface area of the polymer layer have proven especially advantageous.

The number of superimposed polymer films is also not critical in itself. In practice, however, usually no more than 40, and preferably no more than 30 polymer layers are to be superimposed on one another. The thickness of the individual layers is generally 20–100 $\mu$m, so that when separator layers are arranged between the individual polymer layers, the overall thickness of the superimposed layers, and accordingly the electrode, is up to 10 mm, and preferably not more than 8 mm. The separator layers are not absolutely necessary, but they do have certain advantages.

EXAMPLES

The superior electrical behavior of polymer electrodes in accordance with the present invention was confirmed by the following experiments.

Two 55 $\mu$m polypyrrole layers were applied in accordance with the invention to a platinum foil serving as the conductor (Example 2). A compact single foil of equivalent thickness (110 $\mu$m) was applied to a platinum foil as a reference sample (Example 1). As an additional experimental variation, a corresponding layered electrode (Example 3) and a corresponding solid electrode (Example 4) were each perforated with 100 holes, each with a 0.5 mm diameter. In all four cases, the geometric area of the electrodes was 8.82 cm$^2$, and the weight of the polypyrrole was about 120 mg. The polypyrrole contained up to 50 wt. % counter-ions and solvent from the production process. Such foils can be produced, for example, by the process described in DE-OS No. 3,223,544.

Test cells were then equipped with these test electrodes, lithium foils of a thickness of 200 $\mu$m as the opposite electrodes, and a 0.5 normal solution of lithium perchlorate in propylene carbonate as the electrolyte. The test cells were subjected to cycling under galvanostatic conditions, in which the polymers were charged up to 4 V and then discharged to 2 V, as measured against a lithium reference electrode.

Table 1 shows the charge conversions (Ah/kg) obtained under several selected cycling conditions (current strength and number of cycles). A charging/discharging current of 0.15 mA/cm$^2$ is equivalent to a slow cycle sequence, while the "high current condition" of 2.2 mA/cm$^2$ is equivalent to extremely rapid cycling. The percentages given in Table 1 indicate the charging efficiency, with 100% representing complete recovery of the charged capacity on discharge.

TABLE 1

Area-specific capacities (in Ah/kg) and charging efficiencies (current yield, in %) of positive polypyrrole electrodes with various layer structures as a function of cyclic charging/discharging currents (mA/cm$^2$)

| Charging/ discharging current | Example 1 | Example 2 | Example 3 | Example 4 |
|---|---|---|---|---|
| 0.15 mA/cm$^2$ (5th cycle) | 65 | 63 | 63 | 65 |
|  | 99% | 99% | 99% | 98% |
| 0.6 mA/cm$^2$ (20th cycle) | 35 | 38 | 53 | 44 |
|  | 99% | 100% | 100% | 100% |
| 2.2 mA/cm$^2$ (20th cycle) | 7 | 11 | 17 | 9 |
|  | 96% | 100% | 100% | 100% |

The values given in Table 1 show no significant difference in the capacity behavior of the various electrode samples for the weak cycle load of 0.15 mA/cm$^2$. However, in cycling at 0.6 mA/cm$^2$, the area-specific capacity of Example 2 showed an 8% improvement over the value for the reference sample (Example 1), and Example 3 showed a 50% improvement. Very favorable capacity behavior was also found for the perforated electrode of Example 4 under the same test conditions, but not at the "high current" of 2.2 mA/cm$^2$. However, under this extreme load, with rapid cycling, the measures of the present invention were found to be especially effective. The increase in capacity as compared with the reference sample (Example 1) was 57% for Example 2 and 140% for Example 3.

It will be understood that various changes in the details, materials and arrangement of parts which have been herein described and illustrated in order to explain the nature of this invention may be made by those skilled in the art within the principle and scope of the invention as expressed in the following claims.

What is claimed is:

1. An electrochemical secondary element having at least one electrode with an active material comprised of a conductive organic polymer compound of polyconjugated structure selected from the group consisting of polythiophene and polyaniline, which can be doped with cations or anions, and which can be formed as a thin, film-like layer, wherein at least two of said thin polymer layers are applied to a flat electrode conductor, and wherein the polymer layers are perforated.

2. The electrochemical secondary element of claim 1 wherein the diameter of the perforations is at least 10 $\mu$m.

3. The electrochemical secondary element of claim 1 wherein the collective area of the perforations is no more than 50% of the surface area of the electrode conductor.

4. The electrochemical secondary element of claim 3 wherein the collective area of the perforations is from 10 to 80% of the total surface area of the polymer layer.

5. The electrochemical secondary element of claim 4 wherein the collective area of the perforations is from 25 to 70% of the total surface area of the polymer layer.

6. The electrochemical secondary element of claim 1 wherein the number of polymer layers applied to the electrode conductor is no more than 40.

7. The electrochemical secondary element of claim 4 wherein said number is no more than 30.

8. The electrochemical secondary element of claim 1 wherein the thickness of each of the polymer layers is from 20 to 100 $\mu$m.

9. The electrochemical secondary element of claim 8 wherein separator layers are arranged between the polymer layers.

10. The electrochemical secondary element of claim 9 wherein the combined thickness of the electrode is no more than 10 mm.

11. The electrochemical secondary element of claim 10 wherein said combined thickness is no more than 8 mm.

12. The electrochemical secondary element of claim 1 wherein the polymer layers are produced in the presence of a Ziegler catalyst by deposition on an inert carrier from a solution of the underlying monomer in an inert solvent.

13. The electrochemical secondary element of claim 1 wherein the polymer layers are produced on an electrically conducting surface by electropolymerization of the underlying monomer in an electrolytic bath.

14. The electrochemical secondary element of claim 13 wherein polymer layer lying directly on the electrode conductor is formed on the conductor as a deposition surface during the electropolymerization.

15. The electrochemical secondary element of claim 1 wherein the polymer layers are formed of the same material.

16. An electrochemical secondary element having at least one electrode with an active material comprised of a conductive organic polymeric compound of polyconjugated structure selected from the group consisting of polyacetylene and polyprrole, which can be doped with cations or anions, and which can be formed as a thin, film-like layer, wherein at least two of said thin polymer layers are applied to a flat electrode conductor, and wherein the polymer layers are perforated.

17. The electrochemical secondary element of claim 16 wherein the diameter of the perforations is at least 10 $\mu$m.

18. The electromechmical secondary element of claim 16 wherein the collective area of the perforations is no more than 50% of the surface area of the electrode conductor.

19. The electrochemical secondary element of claim 18 wherein the collective area of the perforations is from 10 to 80% of the total surface area of the polymer layer.

20. The electrochemical secondary element of claim 19 wherein the collective area of the perforations is from 25 to 70% of the total surface area of the polymer layer.

21. The electrochemical secondary element of claim 16 wherein the number of polymer layers applied to the electrode conductor is no more than 40.

22. The electrochemical secondary element of claim 21 wherein said number is no more than 30.

23. The electrochemical secondary element of claim 16 wherein the thickness of each of the polymer layers is from 20 to 100 $\mu$m.

24. The electrochemical secondary element of claim 23 wherein separator layers are arranged between the polymer layers.

25. The electrochemical secondary element of claim 24 wherein the combined thickness of the electrode is no more than 10 mm.

26. The electrochemical secondary element of claim 25 wherein said combined thickness is no more than 8 mm.

27. The electrochemical secondary element of claim 16 wherein the polymer layers are formed of the same material.

28. An electrochemical secondary element having at least one electrode comprised of at least two thin, film-like layers each formed of polyacetylene or polypyrrole and which can be doped with cations or anions, applied to a flat electrode conductor, wherein the layers are perforated so that there is unimpeded access of electrolyte through the layers.

* * * * *